(12) United States Patent  (10) Patent No.: US 7,667,865 B2
Ciriza et al.  (45) Date of Patent: Feb. 23, 2010

(54) MOBILE DEVICE-ENABLED SECURE RELEASE OF PRINT JOBS

(75) Inventors: Victor Ciriza, La Tour du Pin (FR); Francois Ragnet, Venon (FR); David L. Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 787 days.

(21) Appl. No.: 11/348,423

(22) Filed: Feb. 6, 2006

(65) Prior Publication Data

US 2007/0182986 A1   Aug. 9, 2007

(51) Int. Cl.
G06F 3/12 (2006.01)
G06K 15/00 (2006.01)

(52) U.S. Cl. .................... 358/1.15; 358/1.14; 358/1.16; 358/1.17

(58) Field of Classification Search ................ 358/1.15, 358/1.14, 1.13, 1.1, 1.16, 1.17, 1.18, 1.9, 358/407, 468, 437, 1.2, 1.4, 1.6, 1.11, 400, 358/403, 434, 435, 436, 438, 439, 450; 399/1, 399/8; 713/150, 182, 189; 380/201, 243, 380/244, 245, 246, 247, 248, 249, 250, 255, 380/270, 55; 382/303, 304, 305, 284, 180; 710/15, 18; 347/2, 3, 5, 14, 23; 715/234, 715/237, 239, 276, 277
See application file for complete search history.

(56) References Cited

U.S. PATENT DOCUMENTS 6,378,070 B1  4/2002  Chan et al.

2004/0172586 A1  9/2004  Ragnet et al.
2005/0138065 A1  6/2005  Ciriza
2006/0136726 A1*  6/2006  Ragnet et al. ............... 713/171

OTHER PUBLICATIONS

Balfanz et al., "Network-in-a-Box: How to Set Up a Secure ... ", Palo Alto Research Center Incorporated, USENIX Association, 17 pp., 2004.
"The PKI page," Public Key Infrastructure (PKI), pp. 1-18, at http://www.pki-page.org/, last visited Dec. 6, 2005.
Brochure for JetCAPS SecureJet 4.1, Hewlett-Packard Company and JetCAPS Europe Labs, 2 pp., May 26, 2003.
SecureJet White paper, Hewlett-Packard Corp., SecureJet—43c/4.5 White Paper, pp. 1-28, Edition 3, Mar. 2005.
"hp jetcaps printing solutions guide," Hewlett-Packard, pp. 1-26, 2000.

* cited by examiner

Primary Examiner—Dov Popovici
(74) Attorney, Agent, or Firm—Fay Sharpe LLP

(57) ABSTRACT

In a printing method, a user at a user terminal (10) having a physically connected mobile device (20) including non-volatile storage constructs an incomplete print job envelope (32) and completing data (34). The completing data (34) are stored on the non-volatile storage of the mobile device (20). The incomplete print job envelope (32) is communicated to a printing device (12). The mobile device (20) is physically disconnected from the user terminal (10), and physically connected with the printing device (12) to reconstruct the print job at the printing device (12) from the incomplete print job envelope (32) and the completing data (34).

22 Claims, 6 Drawing Sheets

MOBILE DEVICE-ENABLED SECURE RELEASE OF PRINT JOBS

BACKGROUND

The following relates to the printing and sheet marking arts. It is described with example illustrated reference to secure printing methods and apparatuses employing a USB drive as a mobile device for securing print jobs. However, the following is amenable to other like printing methods and apparatuses employing other mobile devices, and to other like applications.

Information security includes many facets, such as firewalls to protect a digital network, password protection of computers and other networked devices, encryption of files and data, removable hard drives to enable information to be carried or otherwise physically secured, and so forth. However, an area where information security is sometimes less stringently enforced is the printing phase.

Typically, a user working at his or her personal computer generates and sends a print job to a printer on the network. The print job is queued at the printing system or elsewhere in the network, and the printing system processes print jobs on a first-in-first-out (FIFO) or other ordering basis. This typical sequence of operations introduces potential information security risks.

The queued print job represents one security risk. This is typically a file in a print document language (PDL) such as PostScript, which is communicated from the personal computer to the network printing device. The PDL then resides at the printing device or at a storage queue accessed by the printing device until it is printed. The transfer and temporary storage of the PDL represent opportunities for data theft. The PDL is sometimes in an unencrypted format, and in some cases the PDL includes the entire document content.

The physical printed sheets present another security risk. The push-type nature of the printing process means that the user sends the print job to the printer, where it is printed immediately or after earlier or higher priority print jobs are processed. In either case, it is possible or perhaps even likely that the person who generated the print job will not be present at the printing device when the physical printed sheets are generated, providing another opportunity for information theft.

These information security risks are enhanced in arrangements in which a more substantial delay between the printing and user pickup of the sheets is likely, or in which the printed sheets may be generated in an unsecured location. Such an arrangement exists, for example, when a traveling business person prints confidential material using a hotel printer, or when the printing device is at a commercial print shop that is not owned or controlled by the person who generated the print job.

CROSS REFERENCE TO RELATED PATENTS AND APPLICATIONS

The following U.S. patent applications are commonly assigned with the present application, and are incorporated herein by reference:

Ragnet et al., "Method and Apparatus for Controlling Document Service Requests from a Mobile Device," U.S. patent application Ser. No. 10/605,874 filed 3 Nov. 2003, published as US 2004/0172586 A1 on Sep. 2, 2004, and relating generally at least to aspects of interaction between a mobile device and a wirelessly-equipped printing device, is incorporated by reference herein in its entirety;

Ragnet et al., "Multifunction Device with Secure Job Release," U.S. patent application Ser. No. 11/013,323 filed 14 Dec. 2004 relating generally at least to aspects of secure printing employing wireless mobile devices, is incorporated by reference herein in its entirety;

Ciriza et al., "Secure Printing via a Wireless Internet Service," U.S. patent application Ser. No. 11/347,871, filed Feb. 6, 2006, and relating generally at least to aspects of printing including accounting using a mobile device, is incorporated by reference herein in its entirety; and Ciriza et al. "Mobile Device-Enabled Secure Release of Print Jobs using Parallel Decryption," U.S. patent application Ser. No. 11/348,422, filed Feb. 6, 2006, and relating generally at least to aspects of secure printing employing wireless mobile devices, is incorporated by reference herein in its entirety.

BRIEF DESCRIPTION

According to certain aspects illustrated herein, there is disclosed a printing method comprising: at a user terminal having a connected removable USB drive, decomposing a print job into an incomplete print job envelope and completing data; storing the completing data on the removable USB drive; communicating the incomplete print job envelope to a printing device; disconnecting the removable USB drive from the user terminal; and connecting the removable USB drive with the printing device to reconstruct the print job at the printing device from the incomplete print job envelope and the completing data. The printing device executes the reconstructed print job.

According to certain aspects illustrated herein, a printing method is disclosed, comprising: at a user terminal having a physically connected mobile device including non-volatile storage, constructing an incomplete print job envelope and completing data; storing the completing data on the non-volatile storage of the mobile device; communicating the incomplete print job envelope to a printing device; physically disconnecting the mobile device from the user terminal; and physically connecting the mobile device with the printing device to reconstruct the print job at the printing device from the incomplete print job envelope and the completing data.

According to certain aspects illustrated herein, a printing system is disclosed, comprising: a printing device including a network connection operatively connected with a digital network and a mobile device connector for removably connecting a mobile device including non-volatile storage; and a print job reconstructor that combines an incomplete print job envelope and completing data received via the mobile device connector to form a print job that is executed by the printing device.

According to certain aspects illustrated herein, a print job generator is disclosed, comprising: a user terminal including a network connection operatively connected with a digital network and a mobile device connector; a print driver comprising instructions to generate page description language (PDL) data corresponding to a print job; and an envelope generator comprising instructions to decompose and encrypt the PDL data into (i) an encrypted incomplete print job envelope sent to a printing device via the network connection and (ii) encrypted completing data stored on a mobile device connected with the mobile device connector, the incomplete print job envelope and completing data being configured to enable decryption of the encrypted incomplete print job envelope, decryption of the encrypted completing data, and reconstruction of the PDL data at the printing device responsive to removal of the mobile device from the mobile device connector and connection of the mobile device with the printing device.

DETAILED DESCRIPTION

Figure 1:
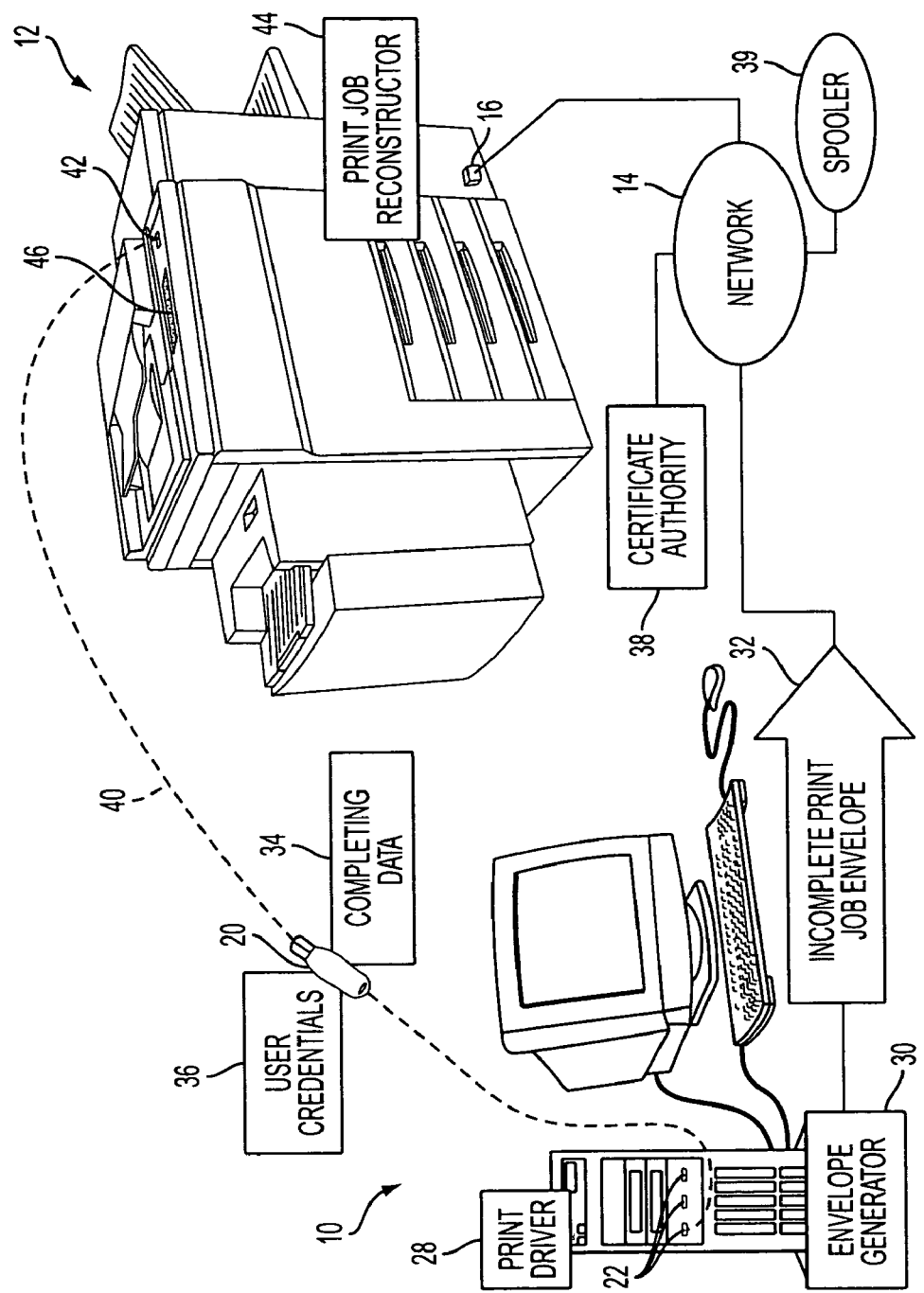
FIG. 1 diagrammatically shows a user terminal and printing system in which print jobs created at the user terminal are printed by the printing system when a removable mobile device illustratively embodied as a USB drive is disconnected from the user terminal and connected with the printing system.
Figure 2:
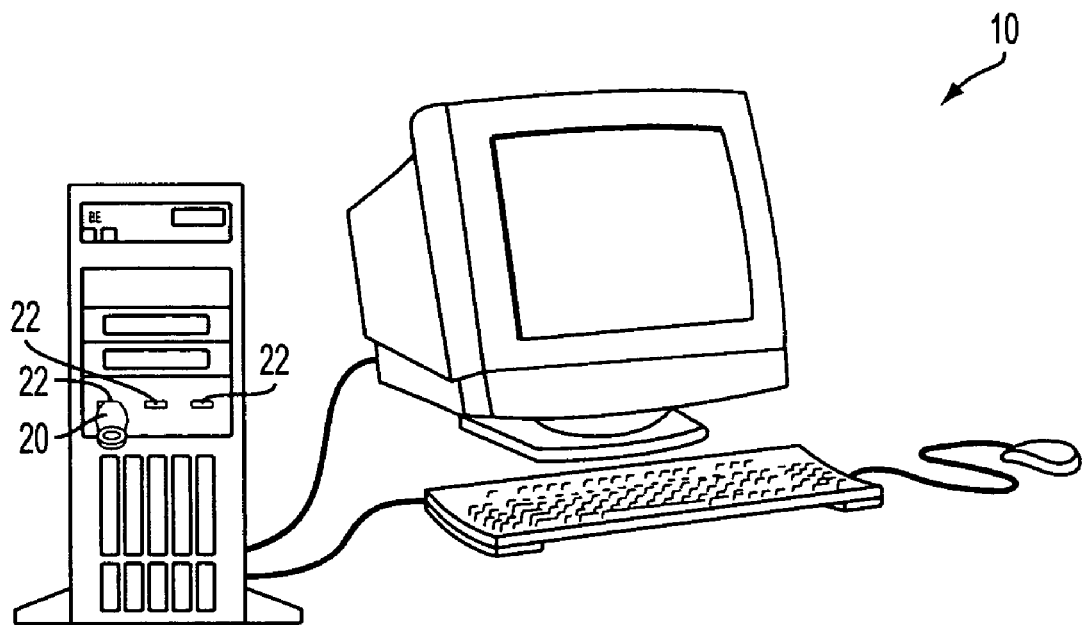
FIG. 2 shows the user terminal of FIG. 1 during generation of the print job, with the USB drive inserted into a USB port of the user terminal.
Figure 3:
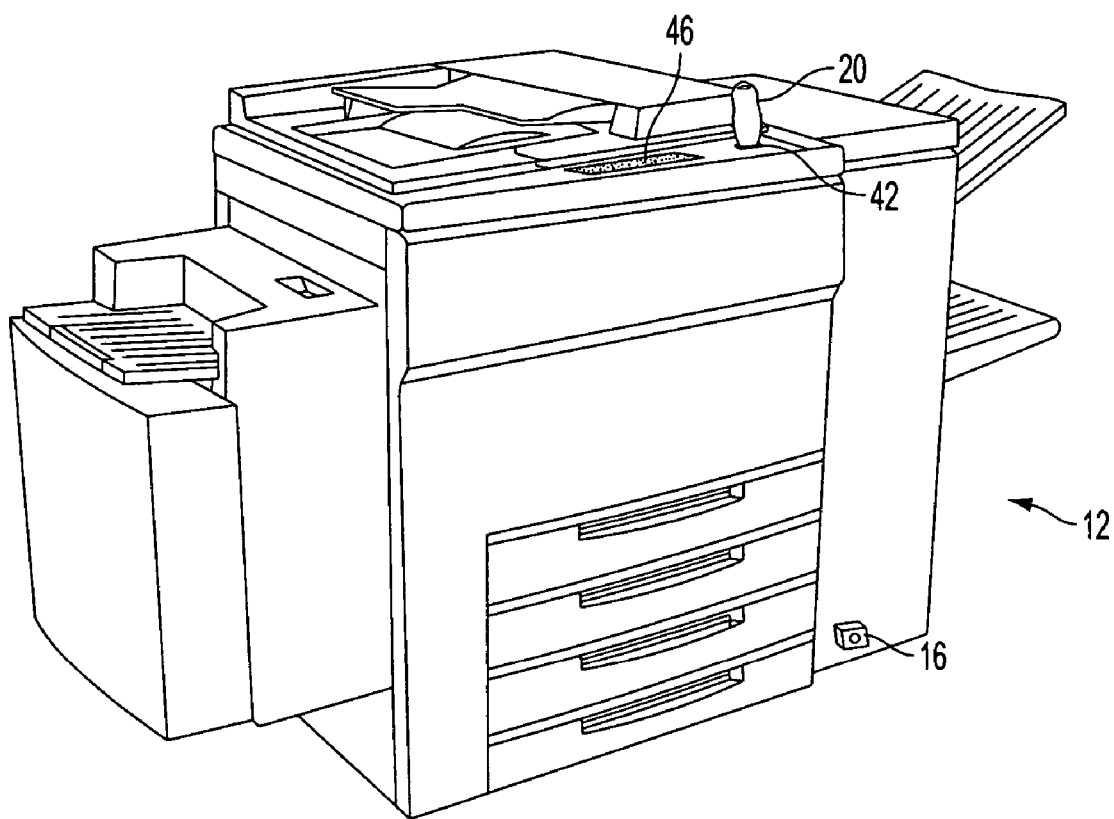
FIG. 3 shows the printing system of FIG. 1 during printing, with the USB drive inserted into a USB port of the printing system.

With reference to FIGS. 1-3, a user terminal 10 enables an employee, professional person, business person, or other user to create, edit, or otherwise prepare or generate a document, such as a word processing document, spreadsheet document, slideshow presentation document, desktop publishing document, or so forth. The illustrated user terminal 10 is a personal computer executing software such as word processing software, spreadsheet software, presentation editing software, desktop publishing software, or so forth, that is suitable for preparing the document. Instead of the illustrated personal computer 10, the user terminal can be a network terminal, workstation, laptop computer having a wired or wireless network connection, or so forth running suitable software. The user terminal may include various input devices such as a keyboard, mouse, trackball, or so forth, and various output devices such as a video display, audio speakers, indicator lamps, or so forth. The user elects to print the document or a portion thereof, and the software executing on the user terminal 10 creates a print job. The user also selects a destination printing device 12 accessible from the user terminal 10 via a digital network 14. The illustrated printing device 12 is a multi-function printer typically including printing, copying, facsimile, scanning, and/or other functional capabilities. In other embodiments, the printing device may be a more basic printer with a single marking engine providing only printing capabilities, or may be a more sophisticated printer including, for example, a print station controller that drives one or more local marking engines and providing a plurality of different sheet processing pathways and capabilities.

The printing device 12 is typically located away from the user terminal 10. For example, the user terminal 10 may be in the user's office or cubicle, while the printing device 12 may be in a central printing location which may be next door to the user's office or cubicle, elsewhere on the same floor as the user's office or cubicle, on a different floor from the user's office or cubicle, or in a different building or city than the user's office or cubicle. The printing system 12 includes a network connection 16 operatively connecting the printing system 12 with the network 14. In FIG. 1 the network connection 16 is a wired network connection; however, a wireless network connection such as a WLAN connection is also contemplated. Similarly, the user terminal 10 is operatively connected with the digital network 14 by a wired or wireless connection. In some embodiments, the digital network 14 may incorporate the Internet; for example, the network 14 may include a local area network at the site of the user terminal 10, a different local area network at the site of the printing system 12, and communication between the local area networks via the Internet or another longer-distance wired or wireless communication pathway. While the single example user terminal 10 is illustrated, typically a plurality of user terminals typically operated by various users can send print jobs to the printing system 12 via the network 14. For example, the printing system 12 may serve an office, a corporation, or so forth. In some embodiments, the printing system 12 is a commercial printing system located at a print shop or other commercial printing center.

The user is typically at the user terminal 10 when the user generates the print job. Accordingly, if the print job were to immediately print, a security risk would present itself as someone other than the user could view the printed sheets before the user travels over to the printing system 12 and picks the sheets up. Similarly, if the print job is queued for later printing (for example, if the printing system 12 has a backlog of print jobs to process from the user and from other users) then the user may again be elsewhere when the printing system 12 prints the print job.

To address this concern, a mobile device 20 including non-volatile storage is employed. The illustrated mobile device is a USB drive. However, in other embodiments the mobile device may be a memory card connected to a card-specific port of the computer, or a digital music player including non-volatile storage, or so forth. By "non-volatile storage" it is meant that the mobile device can store data and can retain the stored data when it is removed or detached from the user terminal 10. The USB drive is a removable drive that is connected to the computer via one of a plurality of Universal Serial Bus (USB) ports 22 and, once connected, appears to the computer as a drive operatively similar to a hard disk drive, floppy disk drive, optical disk, or other storage drive. While the user terminal 10 includes three illustrated USB ports, the number of USB ports on the user terminal can be one, two, three, four, or more. The illustrated USB drive 20 is a USB drive which employs non-volatile flash memory storage or other solid state memory storage. In other embodiments, the USB drive may be a USB hard disk drive which employs a USB connector and rotating magnetic disk storage, an MP3 or other music player that includes a USB connector and non-volatile storage, or so forth. In some embodiments, the non-volatile storage may be a CMOS memory that is kept non-volatile by being powered by an on-board battery or other energy storage device disposed on or in the mobile device. If the mobile device is equipped with another type of connector instead of a USB connector, then the user terminal should include a compatible mobile device connector other than or in addition to the illustrated USB ports 22. For example, if the mobile device is a digital camera memory card, then the mobile device connector is suitably a memory card slot. Employing a USB connector-equipped mobile device has certain advantages. Commercially sold computers and other user terminals typically include one, two, three, four, or more USB ports for enabling connection of a wide variety of USB connector-equipped devices such as removable drives, printers, scanners, and so forth. Moreover, some printing systems are equipped with USB host ports, which simplifies USB connectivity and affords enhanced processing flexibility such as automounting of the file system of the USB drive 20.

With particular reference to FIGS. 1 and 2, at the time the user creates and sends the print job, the USB drive 20 is connected to one of the USB ports 22 of the user terminal 10, as illustrated in FIG. 2. A print driver 28 comprises instructions executing on the user terminal 10 as illustrated, or on another processor connected with the network 14, that generate page description language (PDL) data corresponding to the print job and describing content layout of one or more pages to be printed. The PDL data describes the layout of each page of graphics, text, or other content to be printed. In some embodiments, the PDL data is Postscript data. In some embodiments, the PDL data is HPGL data, PCL data, or another standard PDL format. It is also contemplated for the PDL data to be in a lower-level format, such as rastered bitmap data.

In conventional printing, the PDL data is sent from the user terminal to the printing system, and the printing system operates its marking engine in accordance with the PDL data to produce printed sheets. If the printing system has a backlog, then the PDL data is stored or buffered at the printing system or elsewhere in the network until the printing system can perform the printing. However, this conventional printing has certain security issues, including potential production of the printed pages when the user is not present, and transmission and temporary storage of the unencrypted PDL data at the printing system or at another temporary storage connected with the network.

To address these security issues, an envelope generator 30 comprises instructions executing on the user terminal 10 as illustrated, or on another processor connected with the network 14, that decompose the print job into an incomplete print job envelope 32 that the envelope generator 30 sends to the printing system 12 via the network 14, and completing data 34 that the envelope generator 30 stores on the USB drive 20 or on the non-volatile memory of another mobile device. Optionally, some or all data of the incomplete print job envelope 32 is encrypted, and user credentials 36 assigned to the user or to the USB drive 20 by a certificate authority 38 and stored on the removable USB drive 20 is usable to decrypt the encrypted data. For example, the user credentials 36 may be used to create a public/private session key pair, the incomplete print job envelope 32 encrypted using the public session key, and the private session key needed for decryption stored as part of the completing data 34 on the USB drive 20. Similarly, the completing data 34 may also optionally be encrypted using a password-based encryption or so forth.

The incomplete print job envelope 32 that is sent to the printing system 12 via the network 14 is incomplete in that it cannot be printed by the printing system 12 in the absence of the completing data 34 stored on the USB drive 20. In some embodiments, the incomplete print job envelope 32 is encrypted and cannot be decrypted without the user credentials 36 or other key or keys stored on the USB drive 20; hence, the incomplete print job envelope 32 cannot be printed without the completing information 34 including the decryption key or keys stored on the USB drive 20. In some embodiments, the incomplete print job envelope 32 incorporates less than all of the PDL data, and the completing data 34 incorporates at least a completing portion of the PDL data that is omitted from the incomplete print job envelope 32. Since the incomplete print job envelope 32 is missing some of the PDL data, the incomplete print job envelope 32 cannot be printed without the completing information 34 including the missing PDL data. In some embodiments, both encryption and splitting of the PDL data between the incomplete print job envelope 32 and the completing data 34 are used to ensure that the incomplete print job envelope 32 cannot be printed without the completing information 34 stored on the USB drive 20. Accordingly, the incomplete print job envelope 32 sent to the printing system 12 via the network 14 is stored in an internal buffer of the printing system 12 or in a spooler 39 or other buffer accessible to the printing system 12 via the network 14.

In order to cause the printing system 12 to execute the print job, the user disconnects the USB drive 20 from the USB port 22, carries it along a physical path 40 from the user terminal 10 to the printing system 12 (path diagrammatically indicated by a dashed connector in FIG. 1, but to be understood as including any suitable path which may include any number of diversions such as a lunchroom visit, trip home, or so forth), and connects the USB drive 20 with a USB port 42 of the printing system 12 as shown in FIG. 3. While the illustrated printing system 12 includes the single illustrated USB port 42, the number of USB ports can be one, two, three, four, or more. If the mobile device is equipped with another type of connector instead of a USB connector, then the printing system should include a compatible mobile device connector other than or in addition to the illustrated USB ports 22. For example, if the mobile device is a digital camera memory card, then the mobile device connector is suitably a memory card slot. Employing a USB connector-equipped mobile device has the advantage, however, that commercially sold printing systems typically include one, two, three, four, or more USB ports for enabling connection of computers, USB-equipped digital cameras, scanners, and other devices capable of producing printable content.

Because the USB drive 20 or other mobile device has the completing data 34 stored in non-volatile memory, the completing data 34 remains stored on the mobile device when it is carried along the physical path 40 and is available to the printing system 12 upon connection with the USB port 42 or other mobile device connector of the printing system 12. Moreover, the connection of the USB drive 20 or other mobile device with the USB port 42 or other mobile device connector of the printing system 12 provides assurance that the user is physically present at the printing system 12 at the time the connection is made. That is, the printing is a "pull" type printing in which the user triggers print job execution at the end point, that is, at the printing system 12.

A print job reconstructor 44 executes on the printing system 12 or on another processor communicating with the printing system 12 via the network 14. In some embodiments, operation of the print job reconstructor 44 is initiated based on background port monitoring by a drive automount procedure triggered by connection of the USB drive 20 with the USB port 42. In other embodiments, the user operates a touch-screen LCD display 46 or other user interfacing component of the printing system 12 in order to request execution of the print job, thus invoking the print job reconstructor 44. The latter approach has the advantage of not involving background port monitoring by the printing system's operating system. The print job reconstructor 44 receives the incomplete print job envelope 32 and the completing data 34 and reconstructs the PDL data of the print job. If the incomplete print job envelope 32 is partially or wholly encrypted, then the reconstruction performed by the print job reconstructor 44 includes decrypting the data of the incomplete print job envelope 32 using the decryption key or keys recovered from the completing data 34. If the PDL data is split between the incomplete print job envelope 32 and the completing data 34 stored on the USB drive 20, then the print job reconstructor 44 recombines the split PDL data. The complete unencrypted PDL data is not available at the printing system 12 until after the user connects the USB drive 20 to the USB port 42 of the printing system 12 and the print job reconstructor 40 reconstructs the unencrypted complete PDL data of the print job. Once the reconstruction is complete, the printing system 12 processes the PDL data to execute the print job. For example, if the PDL data is in Postscript, HPGL, PCL, or like format, then the printing system 12 rasters the PDL to generate rastered data for driving one or more marking engines to mark sheets of paper or another print medium. The reconstruction and rastering or other PDL data processing is typically relatively quick, and so the sheets are printed relatively soon after the user inserts the USB drive 20 and optionally selects to execute the print job. Thus, assurance is provided that the user is physically present at the printing system 12 when the printed sheets are produced.

In some embodiments, it is contemplated for the incomplete print job envelope to be unencrypted and to include all PDL data for the print job, but to be incomplete in that the printing system is configured to not execute the print job until it receives a print authorization token that is stored on the USB drive. These embodiments provide assurance that the user is physically present at the printing system 12 when the printed sheets are produced, since the user has connected the USB drive storing the print authorization token. However, it should be appreciated that these embodiments that employ neither encryption of the incomplete print job envelope nor data splitting between the incomplete print job envelope and the USB drive or other mobile device provide substantially no protection against security breaches of the incomplete print job envelope while it is temporarily stored at the printing system. In the illustrated embodiments, encryption and/or data splitting is employed to enhance security of the incomplete print job envelope 32 during transit through the network 14 and during temporary storage at the printing system 12 or elsewhere.

Using a physically connected mobile device such as the illustrated example USB drive 20 has certain advantages over using a mobile device employing a short-range wireless connection such as a Bluetooth-equipped personal data assistant (PDA) as illustrated in copending application Ragnet et al., "Multifunction Device with Secure Job Release," U.S. patent application Ser. No. 11/013,323 filed 14 Dec. 2004. Bluetooth and other short-range communication protocols are not widely supported by existing printing systems. Moreover, the spatial range of the Bluetooth or other short-range wireless link is not well-determined. Hence, the user could inadvertently authorize execution of the print job while, for example, walking somewhere near the printing system (perhaps even on a floor above or below the floor of the printing system 12). In such a case, the printing may occur without the user's knowledge, presenting a security risk. The bandwidth of Bluetooth and other short-range wireless communication protocols is typically not large, which can be a speed bottleneck in embodiments in which some PDL data is stored as part of the completing data on the mobile device. Also, the short-range wireless connectivity of such a mobile device presents an opportunity for a hacker to wirelessly steal the completing data and/or the user credentials. Still further, short-range wireless connectivity can be ambiguous to the user, who may be concerned about the reliability of this intangible print job authorization. These difficulties are alleviated by using a physically connected mobile device. If the completing data 34 is small (for example, a few bytes, tens, or hundreds of bytes of data comprising user identification information, a password, or so forth), it is contemplated for the physically connected mobile device to be a swipe-card or other momentarily connected mobile device.

Figure 4:
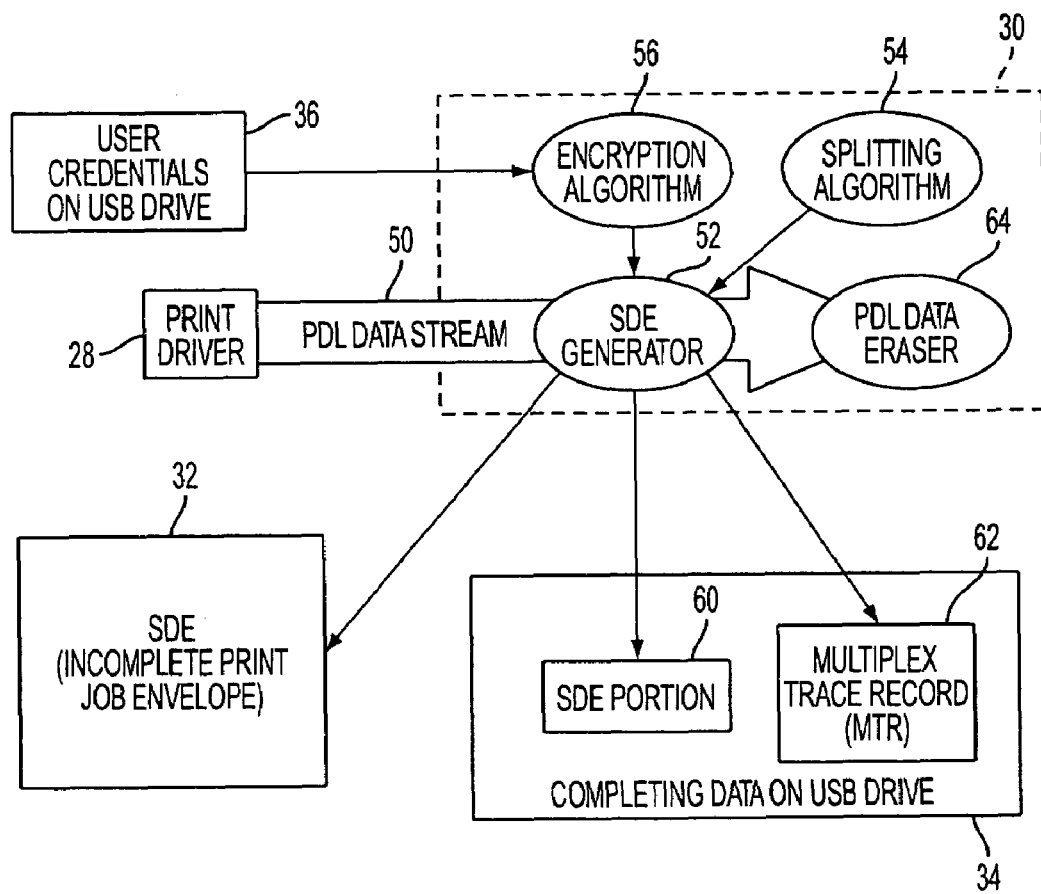
FIG. 4 diagrammatically shows the envelope generator of the user terminal and related elements.

With reference to FIG. 4, some example embodiments of the envelope generator 30 that employ encryption and data splitting are described. The print driver 28 produces a PDL data stream 50 that is input to the envelope generator 30. A secure document envelope generator 52 splits the PDL data in accordance with a splitting algorithm 54 into portions divided between the incomplete print job envelope 32 and the completing date 34 and encrypts each portion in accordance with an encryption algorithm 56. The encrypted PDL data portion or portions assigned to the incomplete print job envelope 32 are stored as a secure document envelope (denoted SDE, where "document" may refer to a printed portion of a word processing or other document). The encrypted PDL data portion or portions assigned to the completing data 34 are stored as a second SDE 60. In some embodiments, the splitting algorithm 54 splits the data with at least about 60% of the PDL data going into the incomplete print job envelope 32 and less than or about 40% of the PDL data going into the completing data 34. In some embodiments, the splitting algorithm 54 splits the data with at least about 90% of the PDL data going into the incomplete print job envelope 32 and less than or about 10% of the PDL data going into the completing data 34. For enhanced security, the splitting algorithm 54 may split the PDL data into non-contiguous portions, for example using a random or pseudorandom selection process. In such embodiments, a multiplex trace record 62 is also stored as part of the completing data 34. The multiplex trace record 62 indicates how the PDL data is split up, so as to enable subsequent reconstruction by the print job reconstructor 44 of the printing system 12. Optionally, the multiplex trace record 62, the SDE 60, or another portion of the completing data 34 also includes a decryption key, user-entered password, or other data to be used for decrypting the PDL data of the incomplete print job envelope 32. To further enhance security, the encryption performed by the SDE generator 52 is optionally performed piecemeal (for example, by separately encrypting each non-contiguous PDL data portion stored in the incomplete print job envelope 32) and a PDL data eraser 64 deletes or overwrites the PDL data after encryption. The two SDE portions 32, 60 are suitably associated with each other by a digitally signed serial number or identifier which is embedded in the portions.

Figure 5:
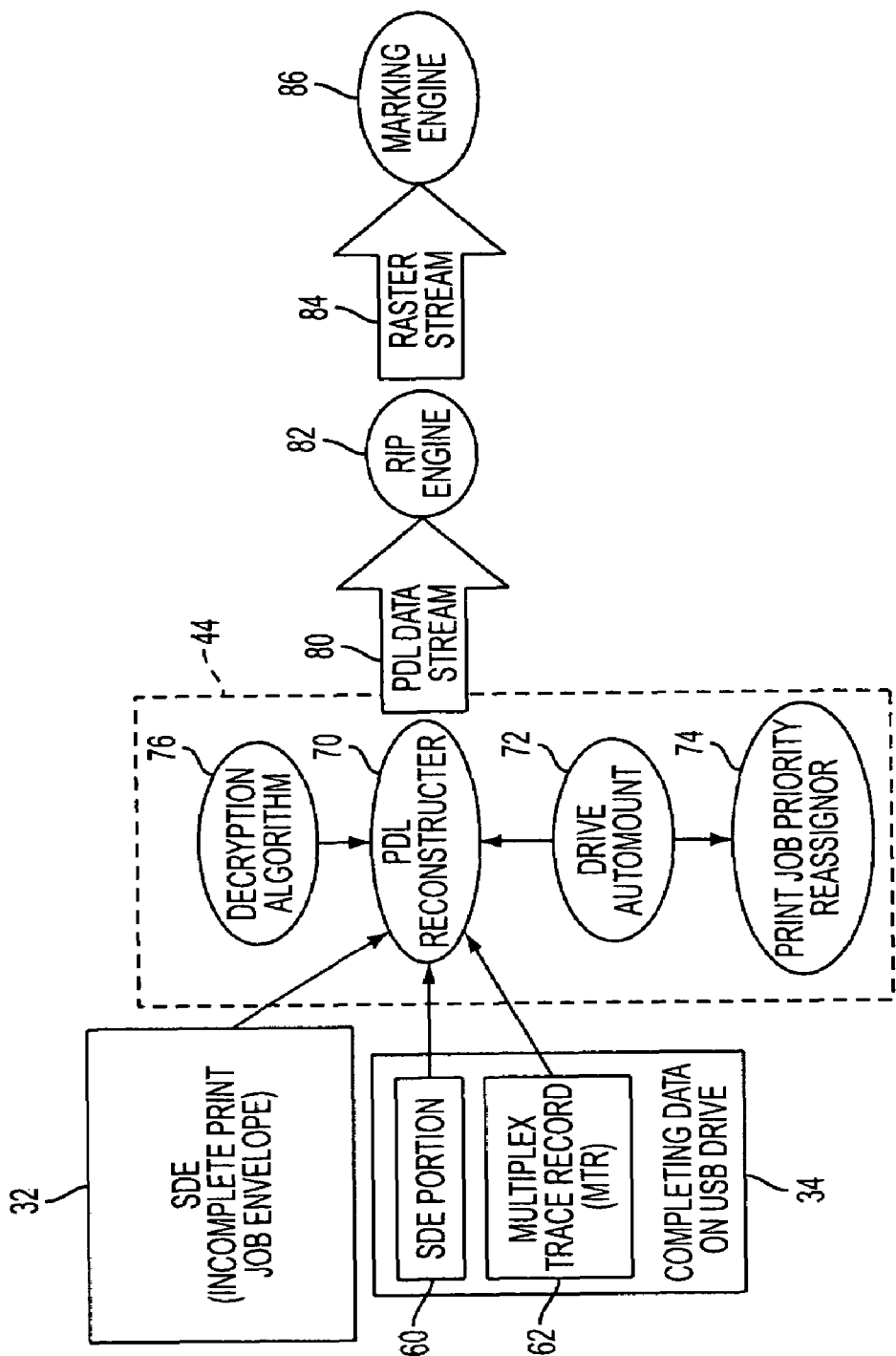
FIG. 5 diagrammatically shows the print job reconstructor of the printing system and related elements.
Figure 6:
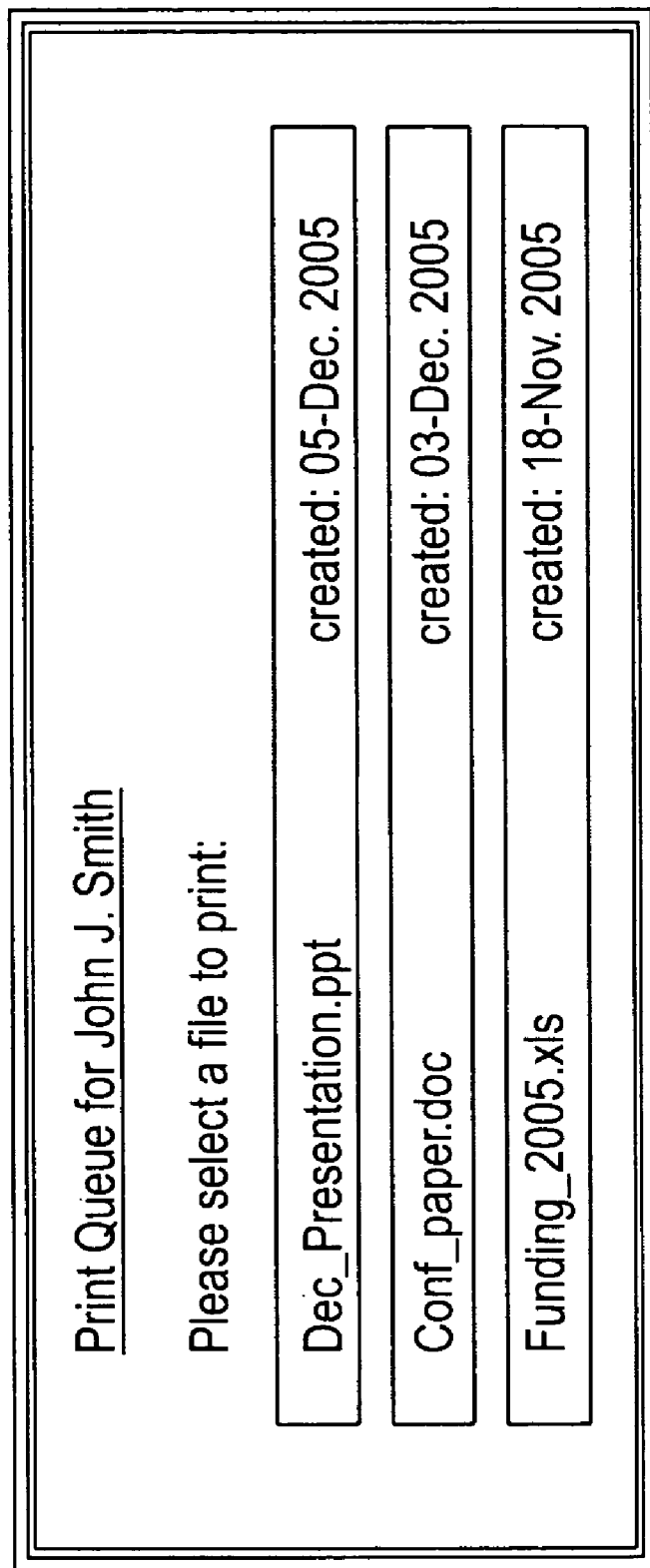
FIG. 6 shows a suitable display screen of a touch-sensitive LCD display of the printing system of FIGS. 1 and 3 for enabling user selection of a print job from print jobs queued on the USB drive.

With reference to FIGS. 5 and 6, some example embodiments of the print job reconstructor 44 are described. A PDL reconstructor 70 reconstructs the PDL data from the SDE of the incomplete print job envelope 32 and the completing SDE portion of the completing data 34. In some embodiments, the PDL reconstructor 70 operation is initiated as part of a drive automount 72 which recognizes connection of the USB drive 20 with the USB port 42 of the printing system 12 and performs certain automount procedures including defining a corresponding logical drive of the printing system 12, identifying the completing data 34 and associating it with the queued incomplete print job envelope 32, and initiating the PDL reconstructor 70. In other embodiments, the drive automount 72 does not automatically start the PDL reconstructor 70, but rather as shown in FIG. 6 identifies the print jobs queued on the USB drive 20 ("queued" in the sense that the completing data for these print jobs is stored on the USB drive 20) and lists those print jobs on the touch-screen LCD display 46 of the printing system 12 for user selection. Optionally, the drive automount 72 also activates a print jobs priority reassignor 74 that assigns highest print priority to the print job or print jobs whose completing data is stored on the mounted USB drive 20. That way, even if the printing system 12 has earlier-queued jobs (which may be unsecured print jobs configured to print on a FIFO basis) the print jobs of the mounted USB drive 20 will take priority so that the user does not have to wait for the secured print jobs to be executed.

The PDL reconstructor 70 employs a decryption algorithm 76 to decrypt the PDL portions of the SDE of the incomplete print job envelope 32 and the completing SDE portion of the completing data 34. The decryption algorithm 76 suitably employs a decryption key or keys stored as part of the completing data 34 on the USB drive 20, or requests the user to enter a decryption password via the touch-screen LCD display 46, or employs a combination of decryption key and password protection. The decryption algorithm 76 is typically implemented as software executing on a processor or controller of the printing system 12; however, it is also contemplated to embody the decryption algorithm 76 partly or wholly as hardware of the printing system 12, for example as a decryption application-specific integrated circuit (ASIC). The output of the PDL reconstructor 70 is a PDL data stream 80 which should correspond to the PDL data stream 50 output by the print driver 28 (see FIG. 4). The PDL data stream 50 is processed by a raster image processing (RIP) engine 82 to produce a raster stream 84 that serves as input to one or more marking engines 86 of the printing device 12 that mark sheets of print media in accordance with the rasterized PDL data stream 80.

A more detailed illustrative example of operation of the secured document printing is now provided. In this example, the PDL data is generated as a file on the user terminal 10. Secured Document Envelope's skeleton building at the user's desktop. The SDE of the incomplete print job envelope 32 has a skeleton in which to place information about: job submitter, such as user name and public key; information about the printing system 12, such as device name, uniform resource indicator (URI) on the network 14, and the printing system's public key; information about the mobile device 20, such as device name or MAC address, device type (such as USB key) and the public key of the user credentials 36; and information about the document, such as the PDL data, encryption method information, and a sub-tree or other structural information about the encrypted elements including the document itself. The PDL data is chunked in accordance with the splitting algorithm 54 into two streams that are processed independently, and the multiplexing pattern is recorded in the multiplexing trace record 62. The first stream is encrypted using a first session key to generate the SDE 32 and spooled to the printing device 12, optionally via a print server, spooler 39, or other intermediary. The printing device 12 identifies the incoming job as a secure print request, suitably stores it in a "secure print" dedicated space, and registers it on the print queue with a suitable status field such as "Waiting for Release". Additionally, the printing system 12 optionally checks the validity of any certificates associated to the incomplete print job envelope 32, in order to verify that none of the certificates associated with the identities used to submit or release the job are in a certificate revocation list issued by the certificate authority 38. Optionally, the printing system 12 employs the Online Certificate Status Protocol to check certificates in real time. Certificate checking is advantageous so as to counteract possible man-in-the-middle attacks. The first session key is suitably stored in the multiplexing trace record 62. The second stream is encrypted using a second session key to produce the SDE portion 60 which is stored along with the multiplexing trace record 62 on the USB drive 20.

When the USB drive 20 is plugged into the USB port 42 of the printing system 12, the printing system 12 mounts the USB drive's file system by the logical drive automount 72 to make the storage volume and its contents visible to the operating system of the printing system 12. The printing system 12 searches on the USB drive's file system to find user credentials 36 (for example, in the form of a digital certificate file), and the completing data 34 bearing a serial number or identifier corresponding to the serial number or identifier of the incomplete print job envelope 32 that is queued on the printing device 12. The printing device 12 then prompts the user to release the job (for example, using the display of FIG. 6), and then encrypts the session key of the incomplete print job envelope 32 asymmetrically with the private key of the USB drive 20 as well as the multiplexing trace record 62 and the SDE portion 60. During this stage the implementation proceeds with the decryption in accordance with the multiplexing trace record 62. The printing system 12 reads the multiplexing trace record 62 from the USB drive's file system, and decides whether the next portion has to be gathered from the SDE 32 available on its queue or from the SDE portion 60 on the USB drive's file system. The printing system 12 sequences chunks in the right order (given by the multiplexing trace record 62) and sends them to the raster image processing engine 82. Pages are printed one after the other and intermediate files are cleaned up. The user collects the printed pages and walks away. Once the printing is completed, the full encrypted document portion is removed from the storage of the printing system 12.

In some situations, the identity of the printing system may not be known ahead of time. For example, a small business may have its printing done at a commercial copy shop. The specific printing system is not known prior to printing. (Indeed, the user may not even know which print shop he or she will use). In this case, the process for generating the incomplete print job envelope 32 and completing information 34 is as set forth previously, with the addition that the incomplete print job envelope 32 is not directly spooled to the printer, but rather is spooled to an Internet-accessible location (for example, suitably represented in FIG. 1 by identifying the network 14 as the Internet and the spooler 39 as the Internet-accessible location). The completing data 34 in this embodiment includes a URL to the Internet-accessible location and a pointer (such as a serial number, access code, or so forth) identifying the incomplete print job envelope 32. The user then goes to the print shop or other printing location and inserts the USB drive 20 into a USB port of the printer to pull the print job. The print job reconstructor of the printing system is configured to read the URL from the completing data 34 and go to the Internet-accessible location to download the incomplete print job envelope 32. The remaining reconstruction processing is as set forth previously.

This approach is also usable to print documents in cases where the user terminal 10 and the printing system 12 are on different networks. In effect, the Internet is used as a joining network connection so that the network 14 includes the Internet, and the spooling to the Internet-accessible location coupled with the URL and pointer stored as part of the completing information defining the network connection through the Internet.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing method comprising:
at a user terminal having a connected removable USB drive, decomposing a print job into an incomplete print job envelope and completing data;
storing the completing data on the removable USB drive;
communicating the incomplete print job envelope to a printing device;
disconnecting the removable USB drive from the user terminal; and
connecting the removable USB drive with the printing device to reconstruct the print job at the printing device from the incomplete print job envelope and the completing data, the printing device executing the re-constructed print job.

2. The printing method as set forth in claim 1, wherein the removable USB drive employs solid-state memory storage.

3. The printing method as set forth in claim 1, wherein the decomposing comprises:
encrypting data of the incomplete print job envelope, a key usable to decrypt the encrypted data being stored on the removable USB drive.

4. The printing method as set forth in claim 1, wherein the decomposing comprises:
incorporating digitally signed identifiers into the incomplete print job envelope and the completing data, the digitally signed identifiers being used in the connecting to associate the completing data and the incomplete print job envelope.

5. The printing method as set forth in claim 1, wherein the decomposing comprises:
generating page description language (PDL) data corresponding to the print job and describing content layout of one or more pages to be printed;
incorporating into the incomplete print job envelope less than all of the PDL data;
incorporating into the completing data at least a completing portion of the PDL data that is omitted from the incomplete print job envelope.

6. The printing method as set forth in claim 5, wherein (i) the PDL data stored in the incomplete print job envelope comprises a plurality of non-contiguous PDL data portions, (ii) the completing portion of the PDL data comprises a plurality of completing non-contiguous PDL data portions, and (iii) the completing data stored on the removable USB drive further comprises a multiplex trace record specifying the non-contiguous division of PDL data into the plurality of non-contiguous PDL data portions.

7. The printing method as set forth in claim 6, wherein the decomposing further comprises:
randomly or pseudorandomly selecting at least one of the non-contiguous PDL data portions stored in the incomplete print job envelope and the completing non-contiguous PDL data portions.

8. The printing method as set forth in claim 1, wherein the decomposing comprises:
generating page description language (PDL) data corresponding to the print job and describing content layout of one or more pages to be printed;
concurrently with the generating, incorporating the generated PDL data into at least the incomplete print job envelope; and
deleting the generated PDL data after the incorporating such that at least some generated PDL data is deleted before the generating is completed.

9. The printing method as set forth in claim 8, wherein the incorporating comprises:
encrypting the incorporated PDL data concurrently with the generating.

10. The printing method as set forth in claim 1, wherein the decomposing comprises:
encrypting at least one of the incomplete print job envelope and the completing data based on user credential information stored on the removable USB drive.

11. The printing method as set forth in claim 1, wherein the connecting comprises:
automatically detecting the connected removable USB drive and responsive to the detecting (i) reading the completing data from the removable USB drive and (ii) reconstructing the print job at the printing device.

12. The printing method as set forth in claim 1, wherein the connecting comprises:
automatically detecting the connected removable USB drive and responsive to the detecting (i) displaying a list of one or more print jobs for which completing data is stored on the connected removable USB drive, (ii) receiving a selection of one of the listed print jobs, and (iii) reconstructing the selected print job at the printing device.

13. A printing method comprising:
at a user terminal having a physically connected mobile device including non-volatile storage, constructing an incomplete print job envelope and completing from a print job;
storing the completing data on the non-volatile storage of the mobile device;
communicating the incomplete print job envelope to a printing device;
physically disconnecting the mobile device from the user terminal; and
physically connecting the mobile device with the printing device to reconstruct the print job at the printing device from the incomplete print job envelope and the completing data.

14. The printing method as set forth in claim 13, wherein the mobile device is selected from a group consisting of (i) a USB drive, (ii) a digital music player, and (iii) a memory card.

15. The printing method as set forth in claim 13, wherein the constructing comprises:
incorporating into the incomplete print job envelope less than all PDL data corresponding to the print job;
incorporating into the completing data at least a completing portion of the PDL data corresponding to the print job and omitted from the incomplete print job envelope.

16. The printing method as set forth in claim 15, wherein the incomplete print job envelope incorporates at least about 60% of the PDL data and the completing data incorporates less than or about 40% of the PDL data.

17. The printing method as set forth in claim 15, wherein the incomplete print job envelope incorporates at least about 90% of the PDL data and the completing data incorporates less than or about 10% of the PDL data.

18. A print job generator comprising:
a user terminal including a network connection operatively connected with a digital network and a mobile device connector;
a print driver comprising instructions to generate page description language (PDL) data corresponding to a print job; and
an envelope generator comprising instructions to decompose and encrypt the PDL data into (i) an encrypted incomplete print job envelope sent to a printing device via the network connection and (ii) encrypted completing data stored on a mobile device connected with the mobile device connector, the incomplete print job envelope and completing data being configured to enable decryption of the encrypted incomplete print job envelope, decryption of the encrypted completing data, and reconstruction of the PDL data at the printing device responsive to removal of the mobile device from the mobile device connector and connection of the mobile device with the printing device.

19. The print job generator as set forth in claim 18, wherein the mobile device connector is a USB port.

20. A printing system comprising:
a printing device operatively connected with a digital network;
a user terminal including a network connection operatively connected with the digital network and a mobile device connector;
a print driver comprising instructions to generate page description language (PDL) data corresponding to a print job; and
an envelope generator comprising instructions to decompose and encrypt the PDL data into (i) an encrypted incomplete print job envelope sent to the printing device via the network connection and (ii) encrypted completing data stored on a mobile device connected with the mobile device connector, the incomplete print job envelope and completing data being configured to enable decryption of the encrypted incomplete print job envelope, decryption of the encrypted completing data, and reconstruction of the PDL data at the printing device responsive to removal of the mobile device from the mobile device connector and connection of the mobile device with the printing device.

21. The printing system as set forth in claim 20, wherein the mobile device connector is a USB port.

22. The printing system as set forth in claim 20, wherein the mobile device connector is a memory card port.

* * * * *